United States Patent
Imatomi et al.

(10) Patent No.: US 6,321,940 B1
(45) Date of Patent: Nov. 27, 2001

(54) INJECTION APPARATUS AND METHOD OF CONTROLLING THE SAME

(75) Inventors: Yoshiyuki Imatomi; Tomohiro Hirano, both of Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/618,717

(22) Filed: Jul. 18, 2000

(30) Foreign Application Priority Data

Jul. 23, 1999 (JP) .................................................. 11-209246

(51) Int. Cl.⁷ ...................................................... B67D 5/62
(52) U.S. Cl. .......................... 222/63; 222/146.2; 222/333; 425/547
(58) Field of Search ..................... 222/63, 146.2, 222/146.5, 412, 413, 333; 425/547

(56) References Cited

U.S. PATENT DOCUMENTS

| | | | | |
|---|---|---|---|---|
| 3,888,393 | * | 6/1975 | Drori | ..................... 222/413 |
| 3,889,849 | * | 6/1975 | Chandler, Jr. | ........................... 222/63 |
| 4,183,448 | * | 1/1980 | Nash | ....................... 222/63 |
| 4,667,852 | * | 5/1987 | Siemann | ................... 222/63 |
| 5,153,008 | * | 10/1992 | Koch | ................................ 222/146.5 |

\* cited by examiner

*Primary Examiner*—Kevin Shaver
*Assistant Examiner*—Patrick Buechner
(74) *Attorney, Agent, or Firm*—Arent Fox Kintner Plotkin & Kahn, PLLC (57) ABSTRACT

An injection apparatus which can reduce frictional resistance which acts on resin during an injection step to thereby prevent variation in a reference position and improve quality of molded products. The injection apparatus comprises a heating cylinder; a screw disposed within the heating cylinder to be rotatable and reciprocatable, the screw having a flight portion in which a flight is formed on an outer circumference of a screw body, and a screw head disposed at a front end of the flight portion; a first drive unit for rotating the screw; a second drive unit for advancing and retracting the screw; a screw-advancement control unit for driving the second drive unit in an injection step in order to advance the screw at a predetermined screw speed; and a flight speed control unit for driving the first drive unit in the injection step in order to advance the flight at a flight speed that is apparently lower than the screw speed. Since the frictional resistance acting on resin in the vicinity of the inner circumferential surface of the heating cylinder can be reduced, during the injection step, the injection force can be made to correspond to the injection pressure, so that a sufficiently large injection pressure can be generated.

9 Claims, 4 Drawing Sheets

INJECTION APPARATUS AND METHOD OF CONTROLLING THE SAME

BACKGROUND OF THE INVENTION

1. Field of the Invention

The present invention relates to an injection apparatus and a method of controlling the same.

2. Description of the Related Art

Conventionally, an injection apparatus is disposed in an injection molding machine. A screw is disposed within a heating cylinder of the injection apparatus such that the screw can be rotated and reciprocated by a metering motor and an injection motor. A spiral flight is formed on the outer circumferential surface of the screw, so that a groove is formed by the flight.

When the screw is rotated in a forward direction during a metering step, pellets of resin which have fallen from a hopper are melted, and molten resin is caused to advance along the groove. As a result, the molten resin is accumulated on the front side of a screw head, and the screw is retracted accordingly.

In order to enable the above-mentioned metering operation, a resin supply section to which pellets of resin are supplied from the hopper, a compression section in which the supplied resin is melted while being compressed, and a metering section in which a predetermined amount of the molten resin is measured are formed on the screw, in this order from the rear end toward the front end. The resin in the groove assumes the form of pellets in the resin supply section, comes into a semi-molten state in the compression section, and is melted completely into liquid in the metering section. The resin supply section, the compression section, and the metering section constitute a flight portion. In the case in which the outer circumferential surface of the screw and the inner circumferential surface of the heating cylinder are of equal surface roughness, when the screw is rotated during the metering step, the resin within the groove rotates together with the screw and does not advance. In order to avoid this problem, in general, the inner circumferential surface of the heating cylinder is made rougher than the outer circumferential surface of the screw.

When the screw is advanced during an injection step, the resin accumulated in front of the screw head is injected from an injection nozzle and charged into a cavity of a mold unit. In order to prevent backflow of the resin accumulated in front of the screw head, which backflow would otherwise occur during the injection step, a backflow prevention unit is disposed around the screw head. The backflow prevention unit includes an annular backflow prevention ring which is disposed to surround a shaft portion of the screw head, and a press metal plate fixed to the front end of the flight portion of the screw. Upon rotation of the screw, the backflow prevention ring assumes a communication position at which the space on the front side of the screw head communicates with the flight portion, and a shut-off position at which the communication between the space on the front side of the screw head and the flight portion is broken. Accordingly, when the screw is rotated in the reverse direction after completion of the metering step to thereby move the backflow prevention ring to the shut-off position, backflow of the resin accumulated in front of the screw head is prevented.

Incidentally, if the pressure of resin in front of the screw head upon starting of the injection step; i.e., injection pressure, involves variation, sink marks and burrs are formed on molded products, resulting in deterioration in quality of the molded products. In order to overcome this problem, the following operation sequence is employed. After completion of the metering step, the backflow prevention ring is moved to the shut-off position, and the screw is temporarily advanced. When the injection pressure reaches a preset pressure, advancement of the screw is stopped, and the stopped position of the screw is stored in a memory as a reference position. Subsequently, the screw is retracted from the reference position so as to perform a suck-back operation. Subsequently, the injection step is started in order to advance the screw by a preset distance from the reference position. The preset distance is calculated on the basis of a quantity of resin to be charged into the cavity, and a distance over which the screw is retracted during the suck-back operation.

As described above, during the injection step, the screw is advanced by a preset distance from the reference position, so that the injection pressure can be maintained at the preset pressure at all times. Therefore, formation of sink marks and burrs on molded products is prevented, and thus the molded products are of improved quality.

However, the conventional injection apparatus has the following drawbacks. Since the inner circumferential surface of the heating cylinder is made rougher than the outer circumferential surface of the screw, when the screw is advanced, a large frictional resistance acts on the resin in the vicinity of the inner circumferential surface of the heating cylinder. In addition, since the state of the resin in the groove of the screw changes while the resin moves from the resin supply section to the compression section and further to the metering section, the frictional resistance acting on the resin varies accordingly.

Therefore, in the injection step, the injection pressure does not correspond to an injection force applied to the screw from its rear end, with the result that the resin cannot be injected with a sufficiently high injection pressure, and the injection pressure varies with the frictional resistance.

As a result, the pressure of resin within a mold; i.e., the mold inner pressure, involves variation, with resultant deterioration in quality of molded products.

Moreover, when the screw is advanced to the reference position after completion of the metering step, a large frictional resistance acts on the resin in the vicinity of the inner circumferential surface of the heating cylinder, so that the relationship between the injection pressure and the position of the screw changes. Therefore, even when the screw is stopped when the injection pressure reaches the preset pressure, the stopped position of the screw varies. As a result, the reference position varies, which lowers the quality of molded products.

SUMMARY OF THE INVENTION

An object of the present invention is to solve the above-mentioned problems in the conventional injection apparatus, and to provide an injection apparatus and a method of controlling the same which can reduce frictional resistance which acts on resin during an injection step to thereby prevent variation in a reference position and improve quality of molded products.

In order to achieve the above object, the present invention provides an injection apparatus comprising: a heating cylinder; a screw disposed within the heating cylinder to be rotatable and reciprocatable, the screw having a flight portion in which a flight is formed on an outer circumference of a screw body, and a screw head disposed at a front end of the flight portion; first drive means for rotating the screw;

second drive means for advancing and retracting the screw; screw-advancement control means for driving the second drive means in an injection step in order to advance the screw at a predetermined screw speed; and flight speed control means for driving the first drive means in the injection step in order to advance the flight at a flight speed that is apparently lower than the screw speed.

Since the frictional resistance acting on resin in the vicinity of the inner circumferential surface of the heating cylinder can be reduced, during the injection step, the injection pressure can be made to correspond to the injection force applied to the screw from its rear end, so that a sufficiently large injection pressure can be generated.

Further, even though the state of the resin within the groove formed by the flight changes while the resin moves within the flight portion, the frictional resistance acting on the resin can be maintained constant, so that the injection pressure can be stabilized. Therefore, the mold inner pressure can be stabilized, whereby quality of molded products can be improved.

Since a sufficiently large injection pressure can be generated, the injection force can be decreased accordingly. Therefore, the size and cost of the injection apparatus can be reduced. In addition, since the frictional resistance decreases, the quantity of shear-generated heat in resin decreases, so that burning of resin can be prevented.

Preferably, a backflow prevention ring is disposed to surround the screw head. Upon rotation of the screw, the backflow prevention ring rotates by a predetermined amount relative to the screw head to assume a communication position in which a space on the front side of the screw head communicates with the flight portion, and a shut-off position in which the communication between the space on the front side of the screw head and the flight portion is broken.

In this case, reverse flow of resin toward the flight portion can be prevented through a simple operation of rotating the screw in the reverse direction. Accordingly, the quantity of resin charged into a mold during the injection step can be stabilized, so that quality of molded products can be improved. Further, since the resin pressure within the flight portion during the injection step can be stabilized, metering can be performed stably in the metering step, whereby the thermal history of the resin can be stabilized, and the temperature of the resin can be stabilized.

Moreover, since the screw is always rotated in the reverse direction during the injection step, the backflow prevention ring is always biased toward the shut-off position. Accordingly, the possibility of the backflow prevention ring being moved to the communication position during the injection step due to reception of an external force is eliminated, so that reverse flow of resin can be prevented. As a result, metering can be performed stably, whereby quality of molded products can be improved.

Preferably, the speed ratio of the flight speed to the screw speed is set to be less than 1 and not less than a minimum value set for the type of resin.

In this case, the frictional resistance acting on resin in the vicinity of the inner circumferential surface of the heating cylinder can be reduced, while the resin pressure within the flight portion is prevented from becoming negative.

Preferably, the injection apparatus further comprises shut-off control means for rotating the screw in the reverse direction in order to move the backflow prevention ring to the shut-off position, in a first stage before start of the injection step; and resin-pressure reduction means for rotating the screw in the reverse direction in order to reduce the resin pressure within the flight portion, in a second stage before start of the injection step.

In this case, since the frictional resistance acting on the resin can be reduced before start of the injection step, the injection pressure can be stabilized more effectively.

Preferably, the flight speed control means advances the flight at a flight speed that is apparently lower than the screw speed until a predetermined period of time has elapsed after start of the injection step, and advances the flight at a flight speed that is apparently equal to the screw speed after elapse of the predetermined period of time.

In this case, since the period of time during which the first drive means is driven decreases, the cost of operation of the injection apparatus can be reduced.

The present invention further provides an injection apparatus comprising: a heating cylinder; a screw disposed within the heating cylinder to be rotatable and reciprocatable, the screw having a flight portion in which a flight is formed on an outer circumference of a screw body, and a screw head disposed at a front end of the flight portion; first drive means for rotating the screw; second drive means for advancing and retracting the screw; first screw-advancement control means for driving the second drive means during a period between completion of a metering step and start of an injection step in order to advance the screw at a predetermined screw speed by a predetermined amount such that the screw is positioned at a reference position; flight speed control means for driving the first drive means, during the advancement of the screw by the predetermined amount, in order to advance the flight at a flight speed that is apparently lower than the screw speed; and second screw-advancement control means for driving the second drive means in the injection step in order to advance the screw at a predetermined screw speed.

In this case, during the period between completion of the metering step and start of the injection step, the screw is advanced by a predetermined amount so as to be positioned at the reference position.

Therefore, the injection pressure at the time of starting the injection step does not involve variation. Accordingly, neither sink marks nor burrs are formed on molded products, so that the molded products have improved quality.

Moreover, while the screw is advanced by the predetermined amount, the flight is advanced at a flight speed that is apparently lower than the screw speed, so that the resin slides along the outer circumferential surface of the screw and stagnates on the inner circumferential surface of the heating cylinder. Accordingly, the frictional resistance acting on the resin in the vicinity of the inner circumferential surface of the heating cylinder can be reduced.

As a result, the relationship between the injection pressure and the position of the screw is prevented from changing. Therefore, when the screw is stopped when the injection pressure reaches the preset pressure, the stopped position of the screw becomes constant (i.e., is without variation). Accordingly, the reference position is prevented from varying, whereby the quality of molded products can be improved.

Preferably, the flight speed control means drives the first drive means during the injection step in order to advance the flight at a flight speed that is apparently lower than the screw speed.

In this case, since the frictional resistance acting on resin in the vicinity of the inner circumferential surface of the heating cylinder can be reduced in the injection step, the injection force can be made to correspond to the injection pressure, so that a sufficiently large injection pressure can be generated.

Further, even though the state of the resin within the groove formed by the flight changes while the resin moves within the flight portion, the frictional resistance acting on the resin can be maintained constant, so that the injection pressure can be stabilized. Therefore, the mold inner pressure can be stabilized, whereby quality of molded products can be improved.

Since a sufficiently large injection pressure can be generated, an injection force can be decreased accordingly. Therefore, the size and cost of the injection apparatus can be reduced. In addition, since the frictional resistance decreases, the quantity of shear-generated heat in resin decreases, so that burning of resin can be prevented.

BRIEF DESCRIPTION OF THE DRAWINGS

The structure and features of the injection apparatus and the method of controlling the same according to the present invention will be readily appreciated as the same becomes better understood by reference to the accompanying drawings, in which.

DESCRIPTION OF PREFERRED EMBODIMENT

An embodiment of the present invention will next be described in detail with reference to the drawings.

Figure 1:
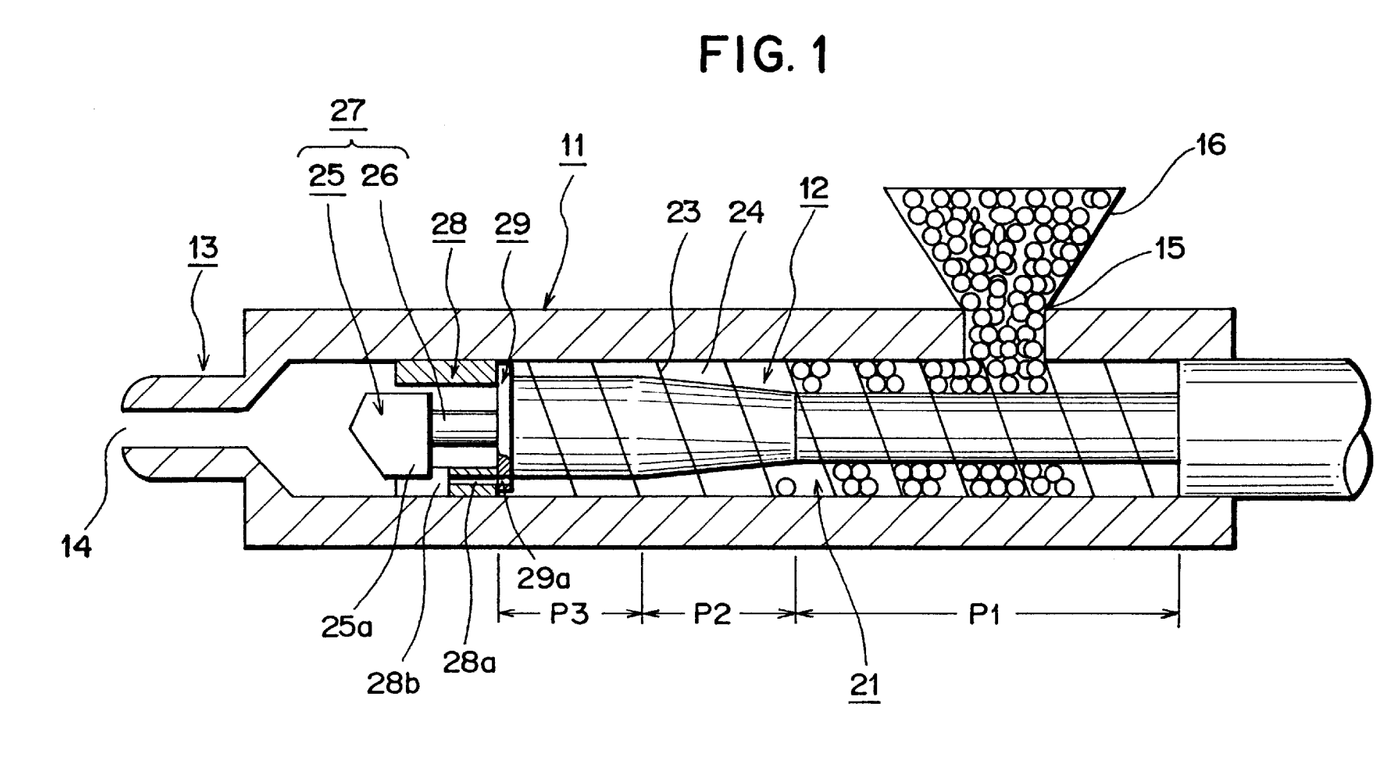
FIG. 1 is an enlarged sectional view of a main portion of an injection apparatus according to an embodiment of the present invention.
Figure 2:
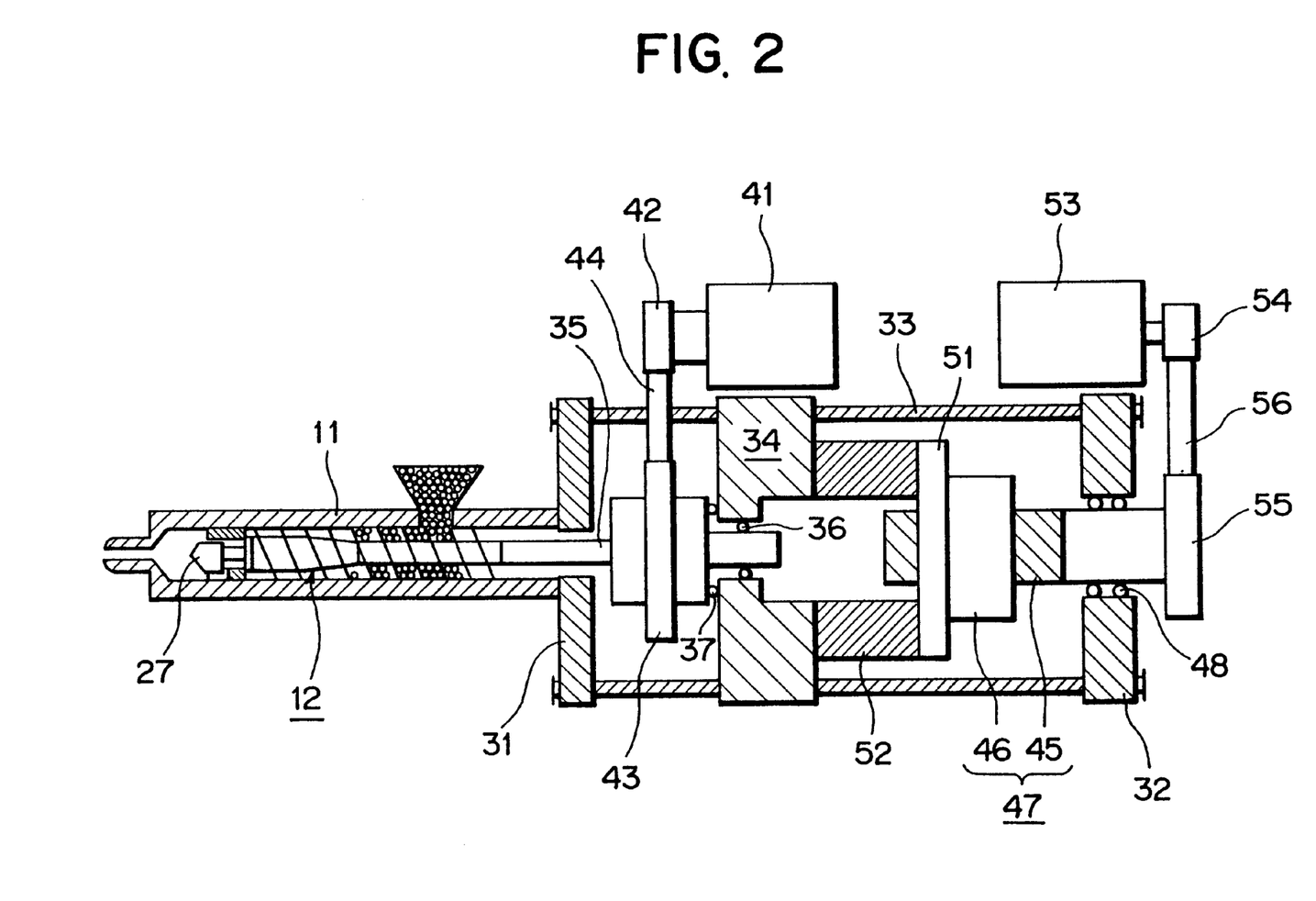
FIG. 2 is a schematic view of the injection apparatus according to the embodiment of the present invention.

FIG. 1 is an enlarged sectional view of a main portion of an injection apparatus according to an embodiment of the present invention; and FIG. 2 is a schematic view of the injection apparatus according to the embodiment of the present invention.

In FIGS. 1 and 2, reference numeral 11 denotes a heating cylinder serving as a cylinder member; reference numeral 12 denotes a screw which is disposed within the heating cylinder 11 such that the screw 12 can be rotated and can be reciprocated and which serves as an injection member; reference numeral 13 denotes an injection nozzle formed at the front end (the left end in FIG. 1) of the heating cylinder 11; reference numeral 14 denotes a nozzle opening formed in the injection nozzle 13; reference numeral 15 denotes a resin supply port formed in the heating cylinder 11 at a predetermined position in the vicinity of the rear end (the right end in FIG. 1) of the heating cylinder 11; and reference numeral 16 denotes a hopper attached to the resin supply port 15 and adapted to accommodate pellets of resin.

The screw 12 has a flight portion 21 and a screw head 27 disposed at the front end of the flight portion 21. The flight portion 21 includes a spiral flight 23 formed on the outer circumferential surface of the screw body, so that a spiral groove 24 is formed by the flight 23. In the flight portion 21, a resign supply section P1 to which pellets of resin are supplied from the hopper 16, a compression section P2 in which the supplied resin is melted while being compressed, and a metering section P3 in which a predetermined amount of the molten resin is measured and formed, in this order from the rear side (the right side in FIG. 1) toward the front side (the left side in FIG. 1). The diameter of the screw 12 measured a the bottom of the groove 24 is set to a relatively small value in the resin supply section P1, and is increased gradually from the rear side toward the front side in the compression section P2, so that the diameter becomes relatively large in the metering section P3. Therefore, the clearance between the inner circumferential surface of he heating cylinder 11 and the bottom of the groove 24 of the screw 12 is relatively large in the resin supply section P1, and decreases gradually from the rear side toward the front side in the compression section P2, so that the clearance becomes relatively small in the metering section P3.

When the screw 12 is rotated in a forward direction during a metering step, pellets of resin are supplied from the hopper 16 to the resin supply section P1, and molten resin is caused to advance (moved to the left in FIG. 1) along the groove 24. As a result, the screw 12 retracts (moves to the right in FIG. 1), and the molten resin is accumulated on the front side of the screw head 27. It is to be noted that the resin in the groove 24 assumes the form of pellets in the resin supply section P1 as shown in FIG. 1, comes into a semi-molten state in the compression section P2, and is melted completely into liquid in the metering section P3.

When the screw 12 is advanced during an injection step, the resin accumulated in front of the screw head 27 is injected from the injection nozzle 13 and charged into a cavity of an unillustrated mold unit. In order to prevent backflow of the resin accumulated in front of the screw head 27 during the injection step, a backflow prevention unit is disposed around the screw head 27.

Specifically, the screw head 27 has a conical head body 25 at its front side and a shaft portion 26 at its rear side. An annular backflow prevention ring 28 is rotatably disposed to surround the shaft portion 26, and a press metal plate 29 is fixed to the front end of the flight portion 21. The backflow prevention ring 28 and the press metal plate 29 constitute the backflow prevention unit.

An axially-extending hole 28a is formed in the backflow prevention ring 28 at a plurality of positions in the circumferential direction; and a cutaway 28b is formed at the front end of the backflow prevention ring 28 to extend over a predetermined angle. An engagement projection 25a formed on the head body 25 is received in the cutaway 28b. By virtue of this structure, when the screw 12 rotates, the backflow prevention ring 28 rotates over a predetermined angle θ relative to the screw head 27 and is restricted from rotating further.

Meanwhile, an axially-extending hole 29a is formed in the press metal plate 29 at a plurality of circumferential positions corresponding to those of the holes 28a. Accordingly, when the backflow prevention ring 28 rotates relative to the screw head 27, communication between the holes 28a and 29a is established selectively. The backflow prevention ring 28 assumes a communication position in which the space on the front side of the screw head 27 communicates with the flight portion 21, and a shut-off position in which the communication between the space on the front side of the screw head 27 and the flight portion 21 is broken.

The rear end (right end in FIG. 2) of the heating cylinder 11 is fixed to a front injection support 31, and a rear injection support 32 is disposed to be separated a predetermined distance from the front injection support 31. Guide bars 33 are disposed and extend between the front injection support 31 and the rear injection support 32, and a pressure plate 34 is disposed such that the pressure plate 34 can advance and retract along the guide bars 33. The front injection support 31 and the rear injection support 32 are fixed to an unillustrated slide base by use of unillustrated bolts.

A drive shaft 35 is connected to the rear end of the screw 12, and the drive shaft 35 is rotatably supported by the pressure plate 34 via bearings 36 and 37. In order to rotate the screw 12, a metering motor (electric motor) 41 is disposed as first drive means; and first rotation transmission means composed of pulleys 42 and 43 and a timing belt 44 is disposed between the metering motor 41 and the drive shaft 35. Therefore, the screw 12 can be rotated forward and backward through drive of the metering motor 41. In the present embodiment, the electric metering motor 41 is used as the first drive means. However, in place of the electric metering motor 41, a hydraulic motor may be used.

A ball screw 47, which is composed of a ball screw shaft 45 and a ball nut 46 in mutual screw-engagement, is disposed on the rear side (on the right side in FIG. 2) of the pressure plate 34. The ball screw 47 serves as motion conversion means for converting rotational motion to linear motion. The ball screw shaft 45 is rotatably supported by the rear injection support 32 via a bearing 48, and the ball nut 46 is fixed to the pressure plate 34 via a plate 51 and a load cell 52. In order to reciprocate the screw 12, an injection motor 53 is disposed as second drive means; and second rotation transmission means composed of pulleys 54 and 55 and a timing belt 56 is disposed between the injection motor 53 and the ball screw shaft 45. Therefore, when the ball screw shaft 45 is rotated through drive of the injection motor 53, the ball nut 46 and the pressure plate 34 are moved, whereby the screw 12 is advanced (moved leftward in FIG. 2) and retracted (moved rightward in FIG. 2). In the present embodiment, the injection motor 53 is used as means for moving the pressure plate 34. However, in place of the injection motor 53, an injection cylinder may be used.

Next, a control circuit for the injection apparatus will be described with reference to FIGS. 3 to 5.

Figure 3:
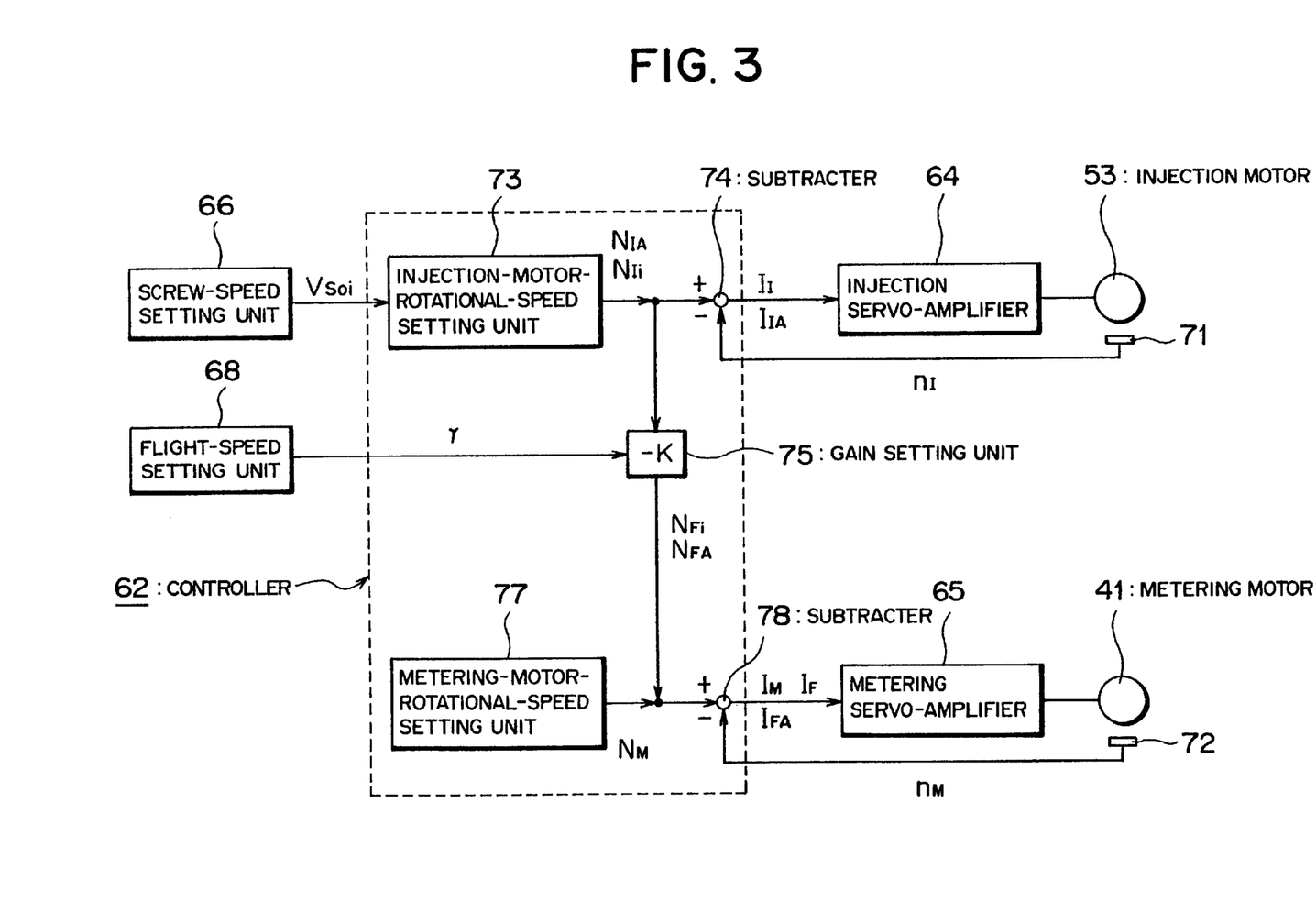
FIG. 3 is a block diagram of a main portion of a control circuit for the injection apparatus according to the embodiment of the present invention.

FIG. 3 is a block diagram of a main portion of a control circuit for the injection apparatus according to the embodiment of the present invention; FIG. 4 is a schematic block diagram of the control circuit for the injection apparatus according to the embodiment of the present invention, and FIG. 5 is a time chart showing operation of the injection apparatus according to the embodiment of the present invention. In the time chart of FIG. 5, a positive value indicates that the metering motor 41 or the injection motor 53 is driven in the forward direction; and a negative value indicates that the metering motor 41 or the injection motor 53 is driven in the reverse direction.

Figure 4:
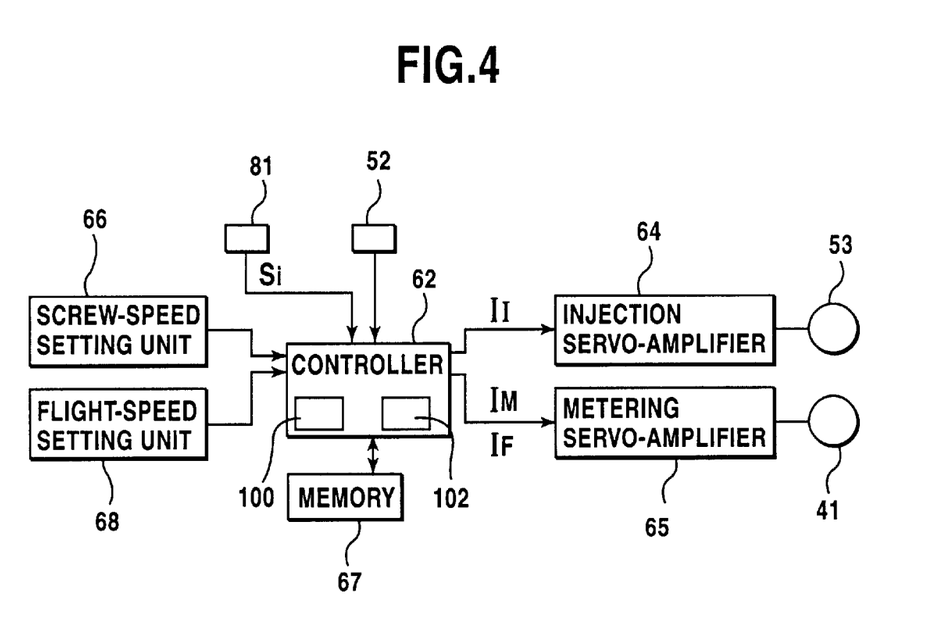
FIG. 4 is a schematic block diagram of the control circuit for the injection apparatus according to the embodiment of the present invention.
Figure 5:
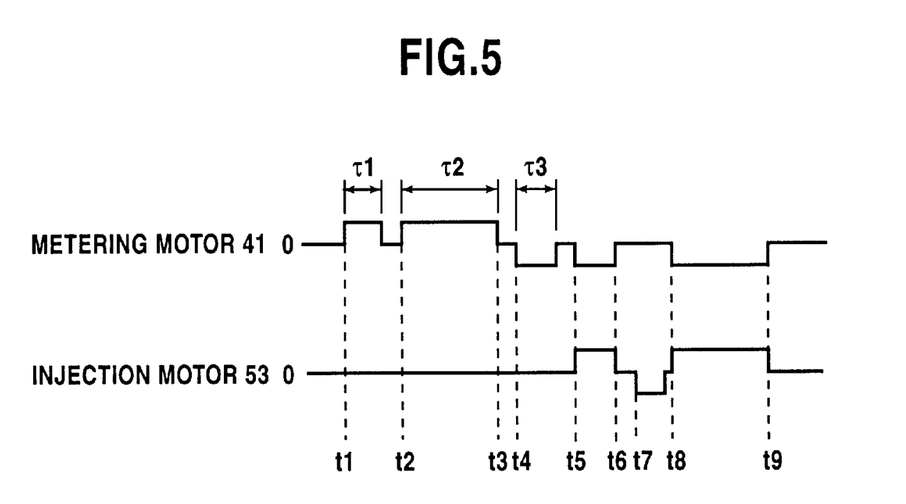
FIG. 5 is a time chart showing operation of the injection apparatus according to the embodiment of the present invention.

In FIGS. 3 and 4, reference numeral 41 denotes a metering motor; 52 denotes a load cell; 53 denotes an injection motor; 62 denotes a controller; 64 denotes an injection servo-amplifier; 65 denotes a metering servo-amplifier; 66 denotes a screw-speed setting unit serving as screw-speed setting means; 67 denotes a memory serving as memory means; 68 denotes a flight-speed setting unit; 71 denotes an injection-motor-rotational-speed detector for detecting rotational speed $n_I$ of the injection motor 53; 72 denotes a metering-motor-rotational-speed detector for detecting rotational speed $n_M$ of the metering motor 41; and 81 denotes a screw position detector for detecting the position of the screw 12 (FIG. 2).

The controller 62 includes an injection-motor-rotational-speed setting unit 73, subtracters 74 and 78, a gain setting unit (−K) 75 serving as metering-motor-rotational-speed calculation means, and a metering-motor-rotational-speed setting unit 77.

Next, operation of the control circuit for the injection apparatus will be described.

During a metering step, the metering-motor-rotational-speed setting unit 77 supplies a preset metering-motor-rotational-speed command $N_M$ to the subtracter 78. The subtracter 78 receives the metering-motor-rotational-speed command $N_M$ and the metering-motor-rotational-speed $n_M$, calculates the deviation $\Delta n_M$ between the metering-motor-rotational-speed command $N_M$ and the metering-motor-rotational-speed $n_M$, and sends the deviation $\Delta n_M$ to the metering servo-amplifier 65 in the form of a current command $I_M$. In this manner, the controller 62 drives the metering motor 41.

In an injection step, the screw speed Vs is changed in multiple steps in accordance with the screw position $S_i$ (i=1, 2, . . . ). For this operation, the screw-speed setting unit 66 generates screw speed command $Vs_{oi}$ (i=1, 2, . . . ) in accordance with the screw position $S_i$, and sends the screw speed command $Vs_{oi}$ to the injection-motor-rotational-speed setting unit 73. Upon reception of the screw speed command $Vs_{oi}$, the injection-motor-rotational-speed setting unit 73 generates an injection-motor-rotational-speed command $N_{Ii}$ (i=1, 2, . . . ) in accordance with the screw speed command $Vs_{oi}$, and sends the injection-motor-rotational-speed command $N_{Ii}$ to the subtracter 74 and the gain setting unit 75. The subtracter 74 receives the injection-motor-rotational-speed command $N_{Ii}$ and the injection-motor-rotational-speed $n_I$, calculates the deviation $\Delta n_I$ between the injection-motor-rotational-speed command $N_{Ii}$ and the injection-motor-rotational-speed $n_I$, and sends the deviation $\Delta n_I$ to the injection servo-amplifier 64 in the form of a current command $I_I$. In this manner, the controller 62 drives the injection motor 53.

As the screw 12 is advanced, a reaction force is generated by resin accumulated in front of the screw head 27, and the load cell 52 is pressed via the pressure plate 34 and the drive shaft 35. At this time, distortion of the load cell 52 is converted to an electric signal. On the basis of the electric signal, an injection pressure is detected, and on the basis of the injection pressure, an injection force at which the screw 12 is pushed from its rear side is calculated.

Incidentally, in the case in which the outer circumferential surface of the screw 12 and the inner circumferential surface of the heating cylinder 11 are of equal surface roughness, when the screw 12 is rotated during the metering step, the resin within the groove 24 (FIG. 1) rotates together with the screw 12 and does not advance. In order to avoid this problem, the inner circumferential surface of the heating cylinder 11 is made rougher than the outer circumferential surface of the screw 12.

However, since the inner circumferential surface of the heating cylinder 11 is made rougher than the outer circumferential surface of the screw 12, when the screw 12 is advanced, a large frictional resistance acts on the resin in the vicinity of the inner circumferential surface of the heating cylinder 11. In addition, since the state of the resin within the groove 24 changes while the resin moves from the resin supply section P1 to the compression section P2 and further to the metering section P3, the frictional resistance acting on the resin varies accordingly.

In order to solve the above-described problem, when the screw 12 is advanced through drive of the injection motor 53 during the injection step, the screw 12 is rotated in the reverse direction through drive of the metering motor 41, whereby the apparent advancement speed of the flight 23 relative to the heating cylinder 11; i.e., the flight speed Vf, is made lower than the screw speed Vs.

That is, the speed ratio γ of the flight speed Vf to the screw speed Vs; i.e., $$\gamma = Vf/Vs,$$

is set to satisfy the following relation.

$$0 \leq \gamma < 1$$

The flight-speed setting unit 68 sends to the gain setting unit 75 the speed ratio γ which has been preset in the above-described manner. Upon reception of the injection-motor-rotational-speed command $N_{Ii}$, the gain setting unit 75 calculates and generates a metering-motor-rotational-speed command $N_{Fi}$ (i=1, 2, . . . ) serving as a flight speed command, in accordance with the screw position $S_i$, while using the speed ratio γ as a gain, and sends the metering-motor-rotational-speed command $N_{Fi}$ to the subtracter 78. The subtracter 78 receives the metering-motor-rotational-speed command $N_{Fi}$ and the metering-motor-rotational-speed $n_M$, calculates the deviation $\Delta n_F$ between the metering-motor-rotational-speed command $N_{Fi}$ and the metering-motor-rotational-speed $n_M$, and sends the deviation $\Delta n_F$ to the metering servo-amplifier 65 in the form of a current command $I_F$. In this manner, the controller 62 drives the metering motor 41. It is to be noted that in place of the flight-speed setting unit 68, a screw-rotational-speed setting unit may be disposed. In this case, a screw rotational speed set by use of the screw-rotational-speed setting unit is supplied to the controller 62. The gain setting unit 75 and the subtracter 78 constitute flight speed control means, which performs flight speed control in order to control the flight speed Vf.

In the above-described manner, during the injection step, the screw 12 is rotated at the screw rotational speed Nf. The above-described control may be modified such that the metering-motor-rotational-speed command $N_{Fi}$ is previously stored in the memory 67 and is read out therefrom in order to perform flight speed control. Alternatively, the control may be modified such that the metering-motor-rotational-speed command $N_{Fi}$ is previously stored in the memory 67 in the form of a rotational speed pattern, and the rotational speed pattern is read out therefrom in order to perform flight speed control.

As described above, since the flight speed Vf is made lower than the screw speed Vs in the injection step, resin slides along the outer circumferential surface of the screw 12 and stagnates on the inner circumferential surface of the heating cylinder 11. Accordingly, the frictional resistance acting on resin in the vicinity of the inner circumferential surface of the heating cylinder 11 can be decreased. As a result, during the injection step, the injection force can be made to correspond to the injection pressure, so that a sufficiently large injection pressure can be generated.

Further, even though the state of the resin in the groove 24 changes while the resin moves from the resin supply section P1 to the compression section P2 and further to the metering section P3, the frictional resistance acting on the resin can be maintained constant, so that the injection pressure can be stabilized. Therefore, the mold inner pressure can be stabilized, whereby quality of molded products can be improved.

Moreover, since the screw 12 is always rotated in the reverse direction during the injection step, the backflow prevention ring 28 is always biased toward the shut-off position. Accordingly, the possibility of the backflow prevention ring 28 being moved to the communication position during the injection step due to reception of an external force is eliminated, so that reverse flow of resin can be prevented. As a result, metering can be performed stably, whereby quality of molded products can be improved.

Since a sufficiently large injection pressure can be generated, the injection force can be decreased accordingly. Therefore, the size and cost of the injection apparatus can be reduced. In addition, since the frictional resistance decreases, the quantity of shear-generated heat in resin decreases, so that burning of resin can be prevented.

Next, operation of the injection apparatus will be described.

Unillustrated communication control means of the controller 62 drives the metering motor 41 in the forward direction at time t1 to thereby rotate the screw 12 in the forward direction at a screw rotational speed N1 for a period τ1. Accordingly, the backflow prevention ring 28 is rotated by an angle θ relative to the screw 12, so that the backflow prevention ring 28 is positioned at the communication position in order to establish communication between the holes 28a and 29a. Subsequently, a metering step is started at time t2 in order to perform metering operation. Specifically, unillustrated metering control means of the controller 62 drives the metering motor 41 in the forward direction to thereby rotate the screw 12 in the forward direction at a screw rotational speed N2 for a period τ2. During this operation, the backflow prevention ring 28 is placed at the communication position, so that the holes 28a and 29a communicate with each other. As a result, after the resin is heated and melted by the heating cylinder 11 while being advanced along the groove 24, the resin flows forward through the holes 28a and 29a and is accumulated in front of the screw head 27. With the accumulation of the resin, the screw 12 is retracted.

When the metering step is completed at time t3, unillustrated shut-off control means of the controller 62 drives the metering motor 41 in the reverse direction at time t4 to thereby rotate the screw 12 in the reverse direction at a screw rotational speed N3 for a period τ3. Accordingly, the backflow prevention ring 28 is rotated by an angle θ relative to the screw 12, so that the backflow prevention ring 28 is positioned at the shut-off position in order to break the communication between the holes 28a and 29a.

Next, first screw-advancement control means 100 of the controller 62 drives the injection motor 53 at time t5 to thereby advance the screw 12 by a predetermined amount or distance. When the injection pressure detected by the load cell 52 reaches a preset pressure at time t6, the screw 12 is stopped. For this operation, the injection-motor-rotational-speed setting unit 73 generates an injection-motor-rotational-speed command $N_{IA}$, and sends the injection-motor-rotational-speed command $N_{IA}$ to the subtracter 74 and the gain setting unit 75. The subtracter 74 receives the injection-motor-rotational-speed command $N_{IA}$ and the injection-motor-rotational speed $n_I$, calculates the deviation $\Delta n_{IA}$ between the injection-motor-rotational-speed command $N_{IA}$ and the injection-motor-rotational speed $n_I$, and sends the deviation $\Delta n_{IA}$ to the injection servo-amplifier 64 in the form of a current command $I_{IA}$. In this manner, the controller 62 drives the injection motor 53 in the forward direction. Unillustrated reference position setting means of the controller 62 regards as a reference position the screw position at which the screw 12 has been stopped at time t6 and stores the screw position in the memory 67.

As described above, during the period between completion of the metering step and start of the injection step, the backflow prevention ring 28 is placed at the shut-off position; the screw 12 is advanced over a predetermined distance through drive of the injection motor 53 and is stopped when the injection pressure reaches the preset pressure; and the screw position at that time is regarded and stored as a reference position. Therefore, the injection pressure at the time of starting the injection step does not involve variation. Accordingly, neither sink marks nor burrs are formed on molded products, so that the molded products have improved quality.

As described above, since the inner circumferential surface of the heating cylinder 11 is made rougher than the outer circumferential surface of the screw 12, when the screw 12 is advanced to the reference position after completion of the metering step, the relationship between the injection pressure and the position of the screw 12 changes if a large frictional resistance acts on resin in the vicinity of the inner circumferential surface of the heating cylinder 11. Therefore, even when the screw 12 is stopped when the injection pressure reaches the preset pressure, the stopped position of the screw 12 varies. As a result, the reference position varies, which lowers the quality of molded products.

In order to avoid this problem, when the screw 12 is advanced during the period between times t5 and t6, the gain setting unit 75 and the subtracter 78 drive the metering motor 41 in the reverse direction to thereby make the flight speed Vf lower than the screw speed Vs.

Specifically, during the period between times t5 and t6, upon reception of the injection-motor-rotational-speed command $N_{IA}$ supplied from the injection-motor-rotational-speed setting unit 73 as well as the speed ratio γ, the gain setting unit 75 calculates a metering-motor-rotational-speed command $N_{FA}$ serving as a flight speed command, while using the speed ratio γ as a gain, and sends the metering-motor-rotational-speed command $N_{FA}$ to the subtracter 78. Upon reception of the metering-motor-rotational-speed command $N_{FA}$ and the metering-motor-rotational-speed $n_M$, the subtracter 78 calculates the deviation $\Delta n_{FA}$ between the metering-motor-rotational-speed command $N_{FA}$ and the metering-motor-rotational-speed $n_M$, and sends the deviation $\Delta n_{FA}$ to the metering servo-amplifier 65 in the form of a current command $I_{FA}$. In this manner, the screw 12 is rotated in the reverse direction at the screw rotational speed Nf. The above-described speed ratio γ is set to satisfy the following relation as in the case of the injection step.

$$0 \leq \gamma < 1$$

As described above, during the period between times t5 and t6; i.e., while the screw 12 is advanced over the predetermined distance, the flight speed Vf is rendered lower than the screw speed Vs, so that the resin slides along the outer circumferential surface of the screw 12 and stagnates on the inner circumferential surface of the heating cylinder 11. Accordingly, the frictional resistance acting on the resin in the vicinity of the inner circumferential surface of the heating cylinder 11 can be reduced.

As a result, the relationship between the injection pressure and the position of the screw 12 is prevented from changing. Therefore, when the screw 12 is stopped when the injection pressure reaches the preset pressure, the stopped position of the screw 12 becomes constant (i.e., is without variation). As a result, the reference position is prevented from varying, whereby the quality of molded products can be improved.

Next, unillustrated suck-back means of the controller 62 drives the injection motor 53 in the reverse direction at time t7 in order to retract the screw 12 from the reference position by a predetermined distance, thereby effecting suck-back operation.

Subsequently, an injection step is started at time t8. Specifically, unillustrated injection control means and a second screw-advancement control 102 means of the controller 62 drive the injection motor 93 in the forward direction in accordance with the injection-motor-rotational-speed command $N_{Ii}$ to thereby advance the screw 12 at a predetermined screw speed Vs by a preset distance from the reference position. Thus, the resin accumulated in front of the screw head 27 is injected from the injection nozzle 13. At this time, a portion of the resin accumulated in front of the screw head 27 is apt to flow backward or move rearward. However, since the communication between the holes 28a and 29a is broken, reverse flow of the resin in front of the screw head 27 can be prevented.

Accordingly, the quantity of resin charged into a mold during the injection step can be stabilized, so that quality of molded products can be improved. Further, since the resin pressure within the flight portion 21 during the injection step can be stabilized, metering can be performed stably in the metering step, whereby the thermal history of the resin can be stabilized and the temperature of the resin can be stabilized. The preset distance is calculated on the basis of a quantity of resin to be charged into the cavity of the mold, and a distance over which the screw 12 retracts during the suck-back operation.

While the screw 12 is advanced in the injection step, the gain setting unit 75 and the subtracter 78 drive the metering motor 41 in the reverse direction in accordance with the metering-motor-rotational-speed command $N_{Fi}$ to thereby advance the flight 23 at the above-described flight speed Vf, which is apparently lower than the screw speed Vs.

Incidentally, when the flight speed Vf is lowered beyond a limit value which depends on the type of resin, there occurs a state in which even though the screw 12 advances, the resin stops substantially on the inner circumferential surface of the heating cylinder 11. As described above, in the injection step, the backflow prevention ring 28 is placed at the shut-off position and the communication between the holes 28a and 29a is broken, so that the resin does not flow into the flight portion 21. Accordingly, if the above-described state of the resin stopping on the inner circumferential surface of the heating cylinder 11 occurs, the resin pressure decreases in a region extending from the resin supply section P1 to the metering section P3; particularly, in the vicinity of the front end of the flight portion 21. As a result, metering operation is difficult to perform stably in the metering step, so that voids, silver streaks, and the like are generated in molded products, which deteriorate the quality of the molded products.

In order to solve the above problem, a minimum value $\gamma_{MIN}$ of the speed ratio γ is set for each type of resin. In this case, the speed ratio γ is set to be less than 1 but not less than the minimum value $\gamma_{MIN}$; e.g., in the range of 0.1 to 0.9.

In the case in which the screw speed Vs is changed in a plurality of steps in accordance with the screw position, the flight speed $Vf_i$ (i=1, 2, . . . ) is also changed in a plurality of steps and is set in accordance with the following equation:

$$Vf_i = \gamma \cdot Vs_i$$

where $Vs_i$ (i=1, 2, ...) is a screw speed set at each screw position $S_i$ (i=1, 2, ...).

Similarly, even in the case in which the screw speed Vs is maintained constant, or is changed in accordance with a function such as a ramp function or an exponential function, the flight speed $Vf_i$ can be changed in accordance with the screw speed $Vs_i$.

Subsequently, when the screw position $S_i$ detected by the screw position detector 81 reaches a predetermined value, the controller 62 changes its control mode from speed control to pressure control, and performs pressure holding control on the basis of the above-described injection force. Subsequently, the controller 62 completes the injection step at time t9.

In the present embodiment, a slight delay is provided between completion of forward rotation of the screw 12 for the period τ1 and start of the metering step. However, the metering step may be started immediately after completion of forward rotation of the screw 12 for the period τ1. In the present embodiment, a slight delay is provided between completion of the metering step and start of reverse rotation of the screw 12. However, the reverse rotation of the screw 12 may be started immediately after completion of the metering step. In the present embodiment, a slight delay is provided between completion of the reverse rotation of the screw 12 and start of advancement of the screw 12 at time t5. However, the advancement of the screw 12 may be started immediately after completion of the reverse rotation of the screw 12. In the present embodiment, a slight delay is provided between completion of the advancement of the screw 12 started at time t5 and start of suck-back operation. However, the suck-back operation may be started immediately after completion of the advancement of the screw 12. In the present embodiment, a slight delay is provided between completion of the suck-back operation and start of the injection step. However, the injection step may be started immediately after completion of the suck-back operation.

Next, the minimum value $\gamma_{MIN}$ will be described.

In an exemplary case in which a resin of high viscosity such as polymethyl-methacrylate resin (methacrylic resin) is used for molding, when the speed ratio γ falls within the range of:

$$0.2 \leq \gamma < 1,$$

the frictional resistance and resin pressure decrease as the flight speed Vf is reduced. When the speed ratio γ falls within the range of:

$$0 \leq \gamma < 0.2,$$

the frictional resistance hardly changes even when the flight speed Vf is reduced; however, the resin pressure decreases and assumes a negative value when the flight speed Vf is reduced.

In another exemplary case in which a resin of low viscosity such as polyamide resin is used for molding, when the speed ratio γ falls within the range of:

$$0.5 \leq \gamma < 1,$$

the frictional resistance and resin pressure decrease as the flight speed Vf is reduced. When the speed ratio γ falls within the range of:

$$0 \leq \gamma < 0.5,$$

the frictional resistance hardly changes even when the flight speed Vf is reduced; however, the resin pressure decreases and assumes a negative value when the flight speed Vf is reduced.

In view of the foregoing, when a resin of high viscosity such as polymethyl-methacrylate resin is used for molding, the speed ratio γ is set to 0.1 to 0.3, preferably to about 0.2, and when a resin of low viscosity such as polyamide resin is used for molding, the speed ratio γ is set to 0.4 to 0.6, preferably to about 0.5. This setting minimizes the frictional resistance, without rendering the resin pressure within the flight portion 21 negative.

Incidentally, the above-described operation may be modified as follows. The period τ3 (FIG. 5) is increased; the above-described shut-off control means is operated in the first half of the period τ3 in order to move the backflow prevention ring 28 to the shut-off position; and unillustrated resin-pressure decreasing means of the controller 62 is operated in the second half of the period τ3 in order to reduce by a predetermined amount the resin pressure in the vicinity of the forward end of the flight portion 21. In this case, since the frictional resistance acting on the resin can be reduced before start of the injection step, the injection pressure during the injection step can be stabilized more effectively.

In addition, the following operation may be employed. In the injection step, the screw 12 is rotated in the reverse direction at a screw rotational speed Nf until a predetermined period of time has elapsed after start of advancement of the screw 12 in order to advance the flight 23 at a flight speed Vf which is apparently lower than the screw speed Vs; and after elapse of the predetermined period of time, the metering motor 41 is stopped in order to advance the flight 23 at a flight speed Vf that is apparently equal to the screw speed Vs.

In this case, although the frictional resistance due to static friction at the time of starting advancement of the screw 12 and the frictional resistance due to the dynamic friction immediately after start of the advancement of the screw 12 are large, the frictional resistance due to dynamic friction after a predetermined period of time has elapsed after start of the advancement of the screw 12 is small. Therefore, if the friction resistance in the initial stage of advancement of the screw 12 can be reduced, the injection pressure after the initial stage can be stabilized without reverse rotation of the crew 12. In this case, the period of time during which the metering motor 41 is driven decreases, the cost of operation of the injection apparatus can be reduced.

The present invention is not limited to the above-described embodiments. Numerous modifications and variations of the present invention are possible in light of the spirit of the present invention, and they are not excluded from the scope of the present invention.

What is claimed is:

1. An injection apparatus comprising:
   (a) a heating cylinder;
   (b) a screw disposed within the heating cylinder to be rotatable and reciprocatable, the screw having a flight portion in which a flight is formed on an outer circumference of a screw body, and a screw head disposed at a front end of the flight portion;
   (c) first drive means for rotating the screw;
   (d) second drive means for advancing and retracting the screw;
   (e) screw-advancement control means for driving the second drive means in an injection step in order to advance the screw at a predetermined screw speed; and
   (f) flight speed control means for driving the first drive means in the injection step in order to advance the flight at a flight speed that is lower than the screw speed.

2. An injection apparatus according to claim 1, wherein
(a) a backflow prevention ring is disposed to surround the screw head; and
(b) upon rotation of the screw, the backflow prevention ring rotates by a predetermined amount relative to the screw head to assume a communication position in which a space on a front side of the screw head communicates with the flight portion, and a shut-off position in which the communication between the space on the front side of the screw head and the flight portion is broken.

3. An injection apparatus according to claim 1, wherein the speed ratio of the flight speed to the screw speed is set to be less than 1 and not less than a minimum value set for a type of resin.

4. An injection apparatus according to claim 1, wherein
(a) the screw speed is changed in a plurality of steps; and
(b) the flight speed is changed in a plurality of steps in accordance with the screw speed.

5. An injection apparatus according to claim 1, further comprising:
(a) shut-off control means for rotating the screw in a reverse direction in order to move the backflow prevention ring to the shut-off position, in a first stage before start of the injection step; and
(b) resin-pressure reduction means for rotating the screw in the reverse direction in order to reduce resin pressure within the flight portion, in a second stage before start of the injection step.

6. An injection apparatus according to claim 1, wherein the flight speed control means advances the flight at a flight speed that is lower then the screw speed until a predetermined period of time has elapsed after start of the injection step, and advances the flight at a flight speed that is equal to the screw speed after elapse of the predetermined period of time.

7. An injection apparatus comprising:
(a) a heating cylinder;
(b) a screw disposed within the heating cylinder to be rotatable and reciprocatable, the screw having flight portion in which a flight is formed on an outer circumference of a screw body, and a screw head disposed at a front end of the flight portion;
(c) first drive means for rotating the screw;
(d) second drive means for advancing and retracting the screw;
(e) first screw-advancement control means for driving the second drive means during a period between completion of a metering step and start of an injection step in order to advance the screw at a predetermined screw speed by a predetermined amount such that the screw is positioned at a reference position;
(f) flight speed control means for driving the first drive means, during the advancement of the screw by the predetermined amount, in order to advance the flight at a flight speed that is lower than the screw speed; and
(g) second screw-advancement control means for driving the second drive means in the injection step in order to advance the screw at a predetermined screw speed.

8. An injection apparatus according to claim 7, wherein the flight speed control means drives the first drive means during the injection step in order to advance the flight at a flight speed that is lower than the screw speed.

9. An injection apparatus according to claim 7, wherein the flight speed is zero.

\* \* \* \* \*